United States Patent [19]
Ho et al.

[11] Patent Number: 5,863,208
[45] Date of Patent: Jan. 26, 1999

[54] LEARNING SYSTEM AND METHOD BASED ON REVIEW

[76] Inventors: Chi Fai Ho, 4816 Cabello Ct, Union City, Calif. 94587; Peter P. Tong, 1807 Limetree La., Mountain View, Calif. 94040

[21] Appl. No.: 675,391

[22] Filed: Jul. 2, 1996

[51] Int. Cl.⁶ .................................................. G09B 7/04
[52] U.S. Cl. ............................................................ 434/362
[58] Field of Search ............................................ 434/362

[56] References Cited

U.S. PATENT DOCUMENTS

| | | | |
|---|---|---|---|
| 5,035,625 | 7/1991 | Monson et al. | 434/332 |
| 5,286,036 | 2/1994 | Barabash | 273/429 |
| 5,306,154 | 4/1994 | Ujita et al. | 434/218 |
| 5,597,312 | 1/1997 | Bloom et al. | 434/362 |

OTHER PUBLICATIONS

Success Maker Courseware, published by Computer Curriculum Corporation. No Date.
Interactive Mathematic Instructor's Guide by Academic Systems, pp. 86 and 114. No Date.
High School Learning and Resource Library by ProOne, photocopy of the box and screen–dump to get 5 pages. No Date.
Guide to Selecting Software by PC Novice, vol. 3, Issue 12, pp. 89–92. No Date.
Active Mind Series from World Wide Web, URL=http://www.broderbund.com/studio/ams.html No Date.
Logical Journal of the Zoombinis from World Wide Web, URL=http://www.broderbund.com/studio/atoz/zoombini.html No Date.
Selecting Software by PC Novice Series, vol. 3, Issue 12, p. 51 and 64 No Date.
Computerized Adaptive Testing, Oct. 24, 1994, from World Wide Web, URL=Gopher://Gopher.ETS.org, Oct. 1994.
Innovation and Technologies, Oct. 21, 1994, from World Wide Web, URL=Gopher://Gopher.ETS.org, Oct. 1994.

*Primary Examiner*—William H. Grieb
*Attorney, Agent, or Firm*—Peter P. Tong

[57] ABSTRACT

A system and method to provide dynamic reviews for individual students. In one embodiment for a student, the system selects an un-learnt line-item, and generates detailed learning materials for the un-learnt line-item. Then the system selects a learnt line-item based on one or more learnt-line-item-selection rules, and generates summarized-learning materials on the selected learnt line-item for the student to review. The summarized-learning materials include study-plans. The detailed learning materials may include questions, in addition to study-plans. For an un-learnt line-item, after presenting the generated learning materials to the student, the present invention assesses the student's understanding in the line-item. If the assessment is satisfactory, the un-learnt line-item is re-classified as a learnt line-item. In another embodiment, the present invention accesses a line-item probability value, which is used to select a line-item. If the line-item is an un-learnt line-item, the invention generates detailed learning materials for the student; and if the student is successful in learning the materials, the invention re-classifies the line-item to a learnt line-item. If the line-item is a learnt line-item, which is selected based on one or more learnt-line-item-selection rules, the invention generates summarized learning materials for the student. The invention then repeats and selects another line-item.

26 Claims, 10 Drawing Sheets

LEARNING SYSTEM AND METHOD BASED ON REVIEW

BACKGROUND OF THE INVENTION

The present invention relates generally to education, and more particularly to using reviews to enrich the learning process in a computer-aided educational system and method.

Review is very important in any educational or training systems. Most of us have encountered situations where we have forgotten what we have learnt, and would appreciate some forms of review to refresh our memory. As subject matter becomes more complicated, our need for review increases, especially when we are learning an inter-disciplinary subject, or solving inter-disciplinary problems. For example, when we encounter the problem of performance degradation due to temperature increase in an integrated circuit, probably some of us would like to design a heat-sink with fins on the integrated circuit, and would like to have a review on the subject of heat-flow on a heat-sink with different types of fins.

In a typical computer-aided educational system, there is no review. Those systems assume the students remember everything they have learnt, and just keep on teaching new areas. If a student wants to review certain subject matter, she can always go back and search for it. However, most students generally do not go back; they typically proceed forward and believe that once they have learnt a subject, they will never forget. As forgetfulness and lack in understanding start to build up, not for long a typical student will be totally lost, with his interest in learning the subject significantly diminished.

There is one exception to the typical educational system; it provides students with reviews. However, those reviews are not dynamic—they are just fixed reviews, which are not personalized. Such a system provides a student a set of study-plan. After the system has presented the study-plan to the student, the system automatically provides a summary of what the student has just learnt. Such an approach is not useful. Since the student has just studied the material, the probability of the student to forget is quite low. Also, the student might understand fully what she has just studied. The system does not know, and does not care. The reviews are fixed. Under no condition would the system not present the review to the student. Such fixed reviews not catered to the needs of individual students are not very helpful to the students.

It should be obvious from the foregoing that there is still a need for a computer-aided educational system and method that is catered specifically to the needs of individual students, or the characteristics of the subject, through dynamic review so as to reinforce each student's learning in a subject.

SUMMARY OF THE INVENTION

The invented computer-aided educational system and method provide dynamic reviews for individual students. After a student has learnt certain areas in a subject, summarized learning materials on those areas are selectively generated for the student so as to reinforce the student's learning in the subject through reviews. Unlike prior systems, the reviews in the present invention are dynamic; they are specifically tailored to the needs of individual students, or the characteristics of the subject.

The present invention is applicable to any subject that can be taught by a computer. A subject in the present invention is divided into areas that the student has learnt and those that the student has not learnt; they are referred to as learnt line-items and un-learnt line-items respectively. The line-items are stored in a line-item storage-medium.

In one embodiment, the present invention selects an un-learnt line-item, and generates detailed learning materials for the un-learnt line-item. Then a learnt line-item is selected based on one or more learnt-line-item-selection rules, depending on factors such as the time elapsed from the time when the student learnt that line-item, the level achieved by the student in learning that line-item, its difficulty level, whether that learnt line-item is related to the selected un-learnt line-item, and whether that learnt line-item has been selected before. Then, the invention generates summarized-learning materials on the selected learnt line-item for the student to review.

Different materials are applicable for learning. The summarized-learning materials include study-plans. The detailed learning materials may further include questions, in addition to study-plans.

For an un-learnt line-item, after presenting the generated learning material to the student, the present invention assesses the student's understanding in the line-item. If the assessment is satisfactory, the un-learnt line-item is re-classified as a learnt line-item.

In another embodiment, the present invention accesses a line-item probability value, which is used to select a line-item. If the line-item is an un-learnt line-item, the invention generates detailed learning materials for the student; and if the student is successful in learning the materials, the invention re-classifies the line-item to a learnt line-item. If the line-item is a learnt line-item, the invention generates summarized learning materials for the student. The invention then repeats and selects another line-item.

Other aspects and advantages of the present invention will become apparent from the following detailed description, which, when taken in conjunction with the accompanying drawings, illustrates by way of example the principles of the invention.

Same numerals in FIGS. 1–9 are assigned to similar elements in all the figures. Embodiments of the invention are discussed below with reference to FIGS. 1–9. However, those skilled in the art will readily appreciate that the detailed description given herein with respect to these figures is for explanatory purposes as the invention extends beyond these limited embodiments.

DETAILED DESCRIPTION OF THE INVENTION

The present invention is applicable to teach any subject that can be taught by a computer. The subject may be a subject taught in one-semester or in a year, or in just one class session. The subject may cover inter-disciplinary areas, such as electrical engineering and thermodynamics, or computer networking and programming techniques. In the following, mathematics is the subject used to illustrate the present invention.

In one embodiment, the subject is divided into major-topics, with each major-topic subdivided into minor-topics, and with each minor-topic further subdivided into line-items. Each line-item typically covers one well-defined area in the subject. In another embodiment, the subject is further divided into more levels below the line-items; and in a third embodiment, the subject is just divided into line-items.

As an example of line-items, if the major-topic is high school algebra, then it can be divided into the following line-items, with bracketed terms served as comments:

High School Algebra (the major-topic)
    (Minor-topics under the major-topic)
    Decimal Numbers
    Polynomials
    Linear Equations
    Quadratic Equations
  Integers
    (Line-items under the minor-topic of integers)
    Addition & Subtraction (Difficulty level 1)
    Multiplication (Difficulty level 2)
    Division (Difficulty level 2)
    Prime Numbers (Difficulty level 3)
    Factorization (Difficulty level 3)
    Common Divisor (Difficulty level 4)
  Fractions
    (Line-items under the minor-topic of fractions)
    Addition & Subtraction (±) with Common Denominator (Difficulty level 3)
    ± with Integers (Difficulty level 4)
    ± without Common Denominator (Difficulty level 5)
    Multiplication and Divisions (*,/) with Integers (Difficulty level 5)
    *,/ with fraction (Difficulty level 6)
    Compound Fractions (Difficulty level 6)
    Fraction Reduction (Difficulty level 7)
    Ratios and Proportions (Difficulty level 7)

Another example with the minor topic being differential calculus is as follows:

Calculus (major topic)
  Differential calculus (minor topic)
    Fractions (Difficulty level 1)
    Polynomials (Difficulty level 1)
    Exponential Functions (Difficulty level 1)
    Differentiation (Difficulty level 2)
    Differentiate a sum (Difficulty level 3)
    Differentiate a product (Difficulty level 3)
    Differentiate a quotient (Difficulty level 4)

In one embodiment, each line-item has a difficulty level. The bracketed difficulty level next to each line-item in the above example indicates how difficult one line-item is relative to other line-item in the subject, or how significant one is relative to another. A line-item whose difficulty level is at a low number implies that it is a relatively easy line-item, or that it is a relatively less important line-item. Typically, a student learning a subject starts from learning line-items at the lowest difficulty level.

The lists of items in the above examples are generated based on expert knowledge on the subject of mathematics. With the proper instruction, such as through reading the present specification, generating such lists with the difficulty levels should be obvious to experts in the subject. The more knowledgeable the expert, the more complete the sets of items.

When the student starts learning the subject, all the line-items are classified as un-learnt line-items. As the student progresses through the subject, he would have learnt some of the line-items, and those un-learnt line-items would then be re-classified as learnt line-items.

Different criteria may be used to evaluate if the student has learnt a line-item. Generally, learning implies achieving a preset mastery level. This level depends, for example, on the subject and the line-item, and is determined by education experts in that subject and in the behavior of human learning. In the present invention, one does not have to totally understand every aspect of a line-item before he is considered to have learnt that line-item. For example, achieved a passing grade in a line-item may indicate having learnt that line-item. In one embodiment, as long as there is an evaluation based on a preset level, and the student has reached or exceeded that level, the student is considered to have learnt that line-item. In another embodiment, as long as there are two types of learning materials on a line-item for the student (detailed learning materials and summarized learning materials), the present invention assumes that there is a preset level in learning that line-item. As the student progresses from the detailed learning materials to the summarized learning materials, the student has achieved the preset level in the detailed learning materials, with the summarized learning materials serving as a review for the line-item.

Figure 1:
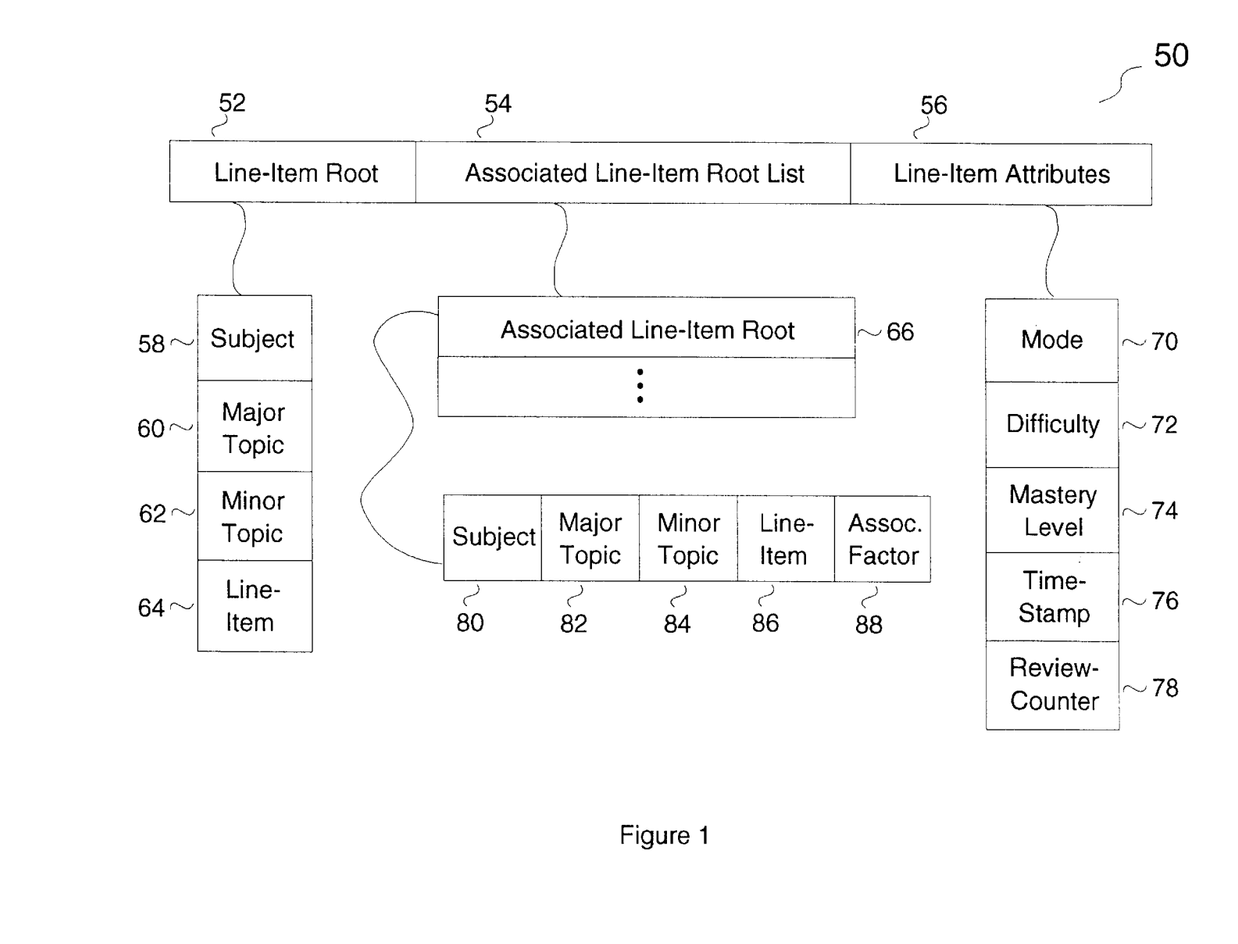
FIG. 1 shows one embodiment of a line-item entry in the present invention.

FIG. 1 shows one embodiment 50 of a line-item entry E representing a line-item. For the sake of clarity, that line-item is known as a parent line-item in this example. The entry E includes a line-item-root 52, an associated line-item-root list 54, and line-item attributes 56.

The line-item root 52 includes the corresponding line-item 64 (the parent line-item) and its root, which in one embodiment includes its subject 58, its major topic 60, and its minor topic 62. The associated line-item-root list 54 may include one or more associated line-item roots, such as 66, with each representing a line-item (a child line-item) that is related to the parent line-item. For example, if the parent line-item is differentiation, the children line-items may include exponential functions, logarithmic functions and hyperbolic functions.

Each associated line-item-root list 54 denotes the corresponding child line-item, its roots, and its association factor, such as 88. The association factor represents the degree of relatedness of each child line-item with the parent line-item 64. For example, the parent line-item 56 is computer network modeling using Poisson process; the children line-items may include the stochastic process and the Guassian process. The stochastic process is more related to the Poisson process than the Guassian process. Thus, the association factor of the stochastic process has a higher value than the association factor of the Guassian process.

The line-item attributes 56 describe a number of attributes for the parent line-item. In one embodiment, the attributes of the parent line-item include, for example, its mode 70, its difficulty level 72, its mastery level 74, its time-stamp 76, and its review-counter 78. The mode 70 denotes whether the student has learnt the line-item (the learnt mode), or the student has not learnt the line-item (the un-learnt mode). The difficulty level 72 denotes the level of difficulty of the parent line-item as compared to other line-items. If the line-item is a learnt line-item, the mastery level 74 denotes the level achieved by the student in learning that line-item; the time-stamp 76 denotes the time when the student achieved that mastery level; and the review-counter 78 denotes the number of times that line-item has been reviewed. Initially, all line-items are in the un-learnt mode, with the mastery levels and the time-stamps not being set, and with the review-counter being zero.

Figure 2:
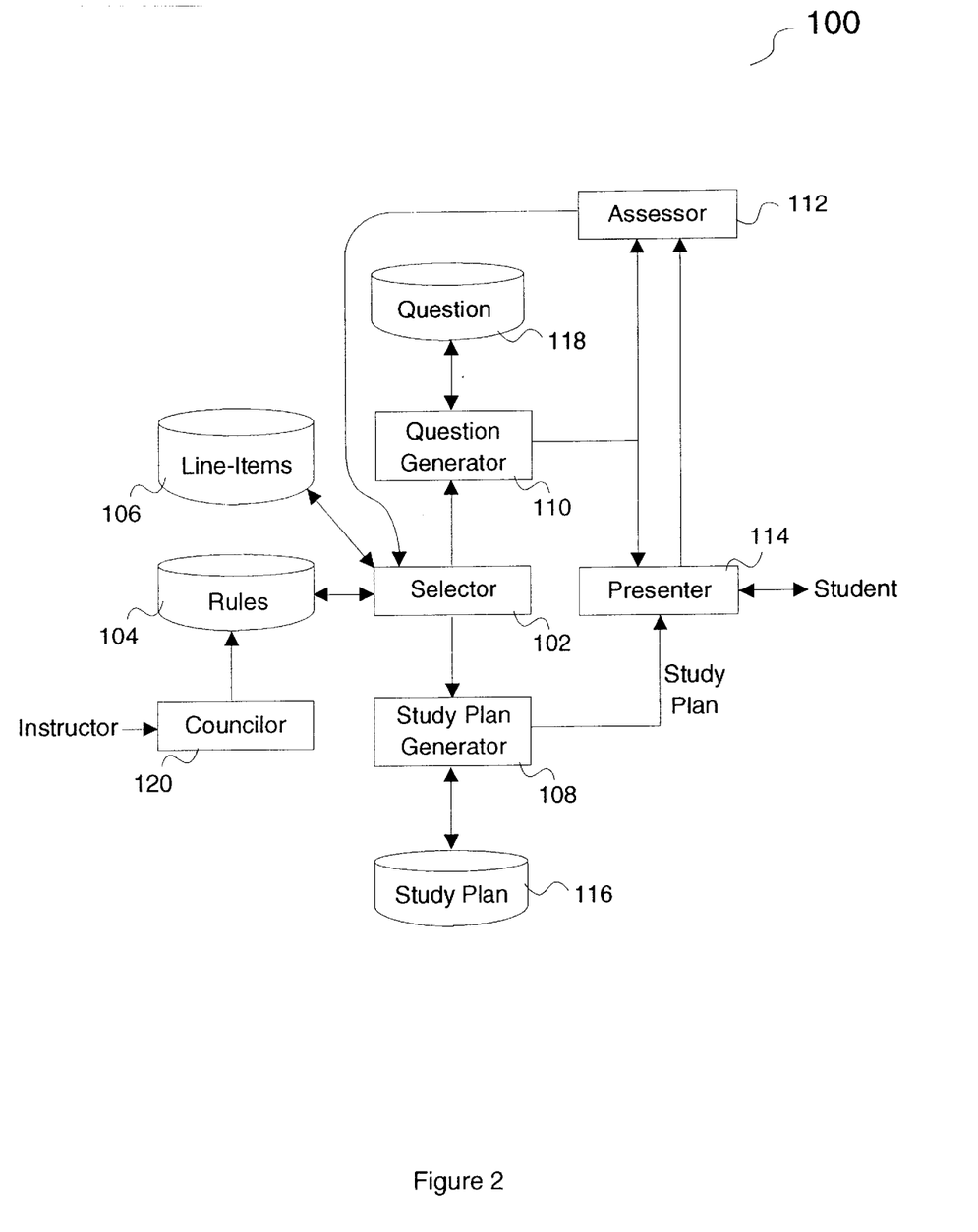
FIG. 2 shows an embodiment of the present invention.

FIG. 2 shows one embodiment of the computer-aided-educational system 100 of the present invention. As an overview of some of its major components, the system 100 includes a line-item storage-medium 106, which stores the learnt and un-learnt line-items of the subject. A selector 102 in the system 100, based on some rules from a rules storage-medium 104, selects a line-item from the line-item storage-medium 106. For the selected line-item, a learning-material generator generates learning materials for the student. In one embodiment, the generator includes a study-plan generator 108, which accesses a study-plan from a study-plan storage-medium 116 for a presenter 114 to present to a student. In another embodiment, the learning material generator further includes a question generator 110. The question generator 110 accesses a set of questions from a question storage-medium 118 and sends the questions to the presenter 114 to be presented to the student. Then, an assessor 112 analyzes the student's performance, and sends the results to the selector 102, which then selects another line-item for the student.

Figure 3A:
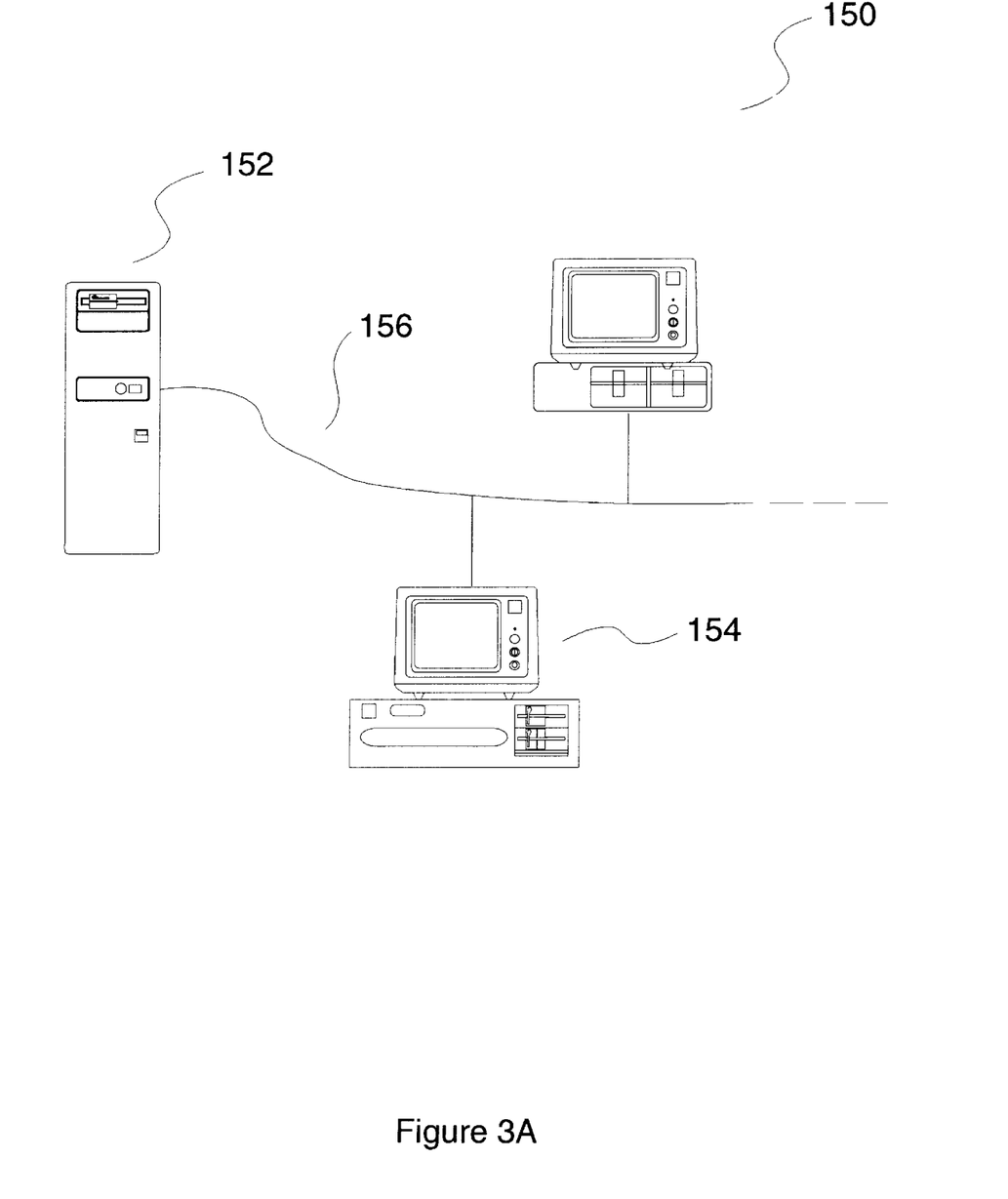
FIGS. 3A–B show one embodiment of a system implementing the present invention.

FIG. 3A shows one embodiment of a system 150 implementing the present invention, preferably in software and hardware. The system 150 includes a server computer 152 and a number of client computers, such as 154. Each client computer communicates to the server computer 152 through a dedicated communication link, or a computer network 156.

Figure 3B:
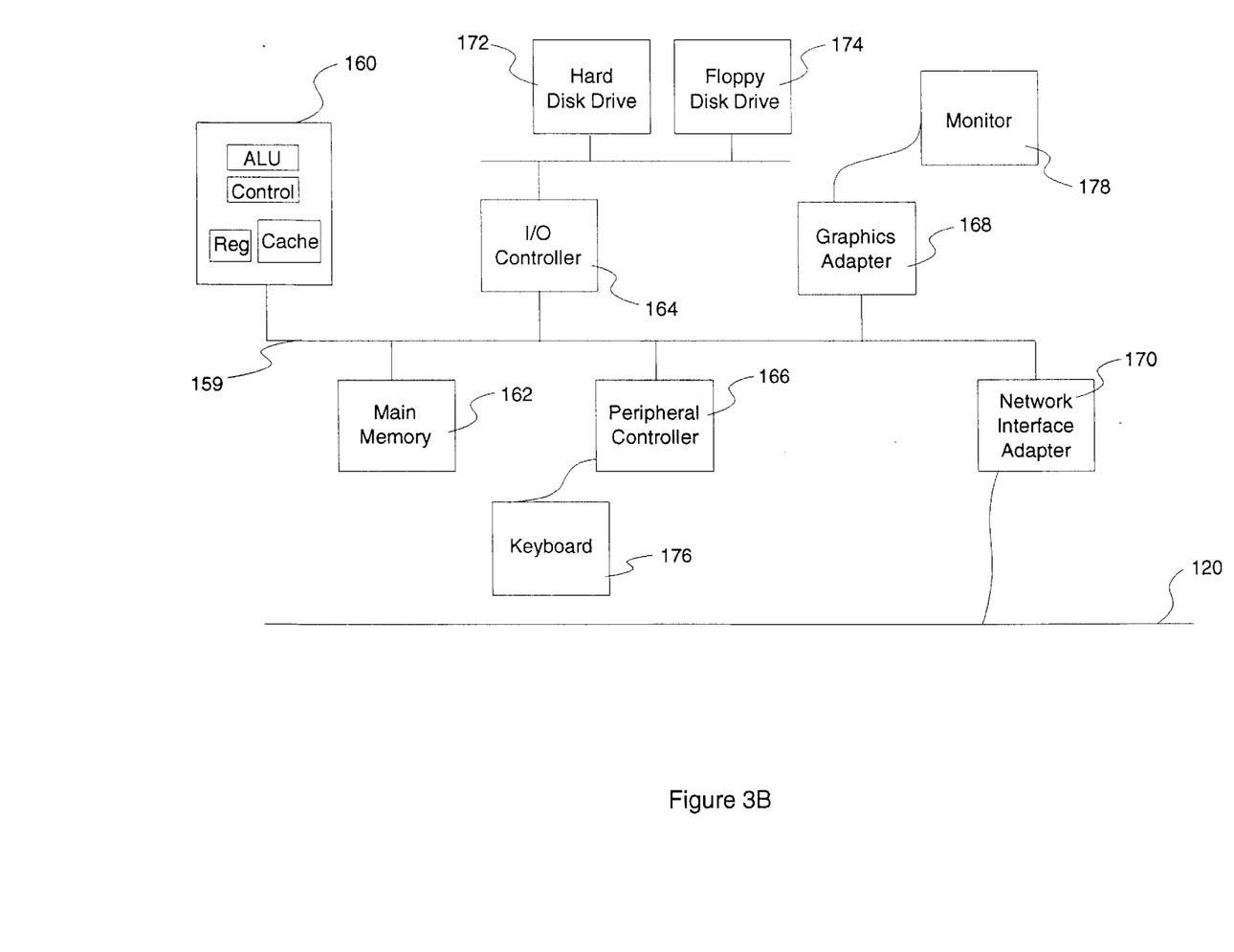

FIG. 3B shows one embodiment of the client computer 154. It typically includes a bus 159 connecting a number of components, such as a processing unit 160, a main memory 162, an I/O controller 164, a peripheral controller 166, a graphics adapter 168 and a network interface adapter 170. The I/O controller 164 is connected to components, such as a harddisk drive 172 and a floppy disk drive 174. The peripheral controller 166 is connected to components, such as a keyboard 176. The graphics adapter 168 is connected to a monitor 178; and the network interface adapter 170 is connected to the network 120. The network includes the internet, an intranet, the world wide web and other forms of networks.

Different components of the present invention can be in different elements shown in FIGS. 3A–B. For example, the presenter 114 and the assessor 112 can be in a client computer; the selector 102, the question generator 110, the study-plan generator 108, and the line-item storage-medium 106 can be in the server computer 152. In another embodiment, the selector 102, the question generator 110 and the study-plan generator 108 are also in a client computer. A number of operations in the present invention can be implemented by software, which is controlled, for example, by the processing unit 160. In yet another embodiment, the number of operations implemented by software can be stored in a storage-medium, which can be, for example, the main memory 162 or a CD read-only-memory.

Figure 4:
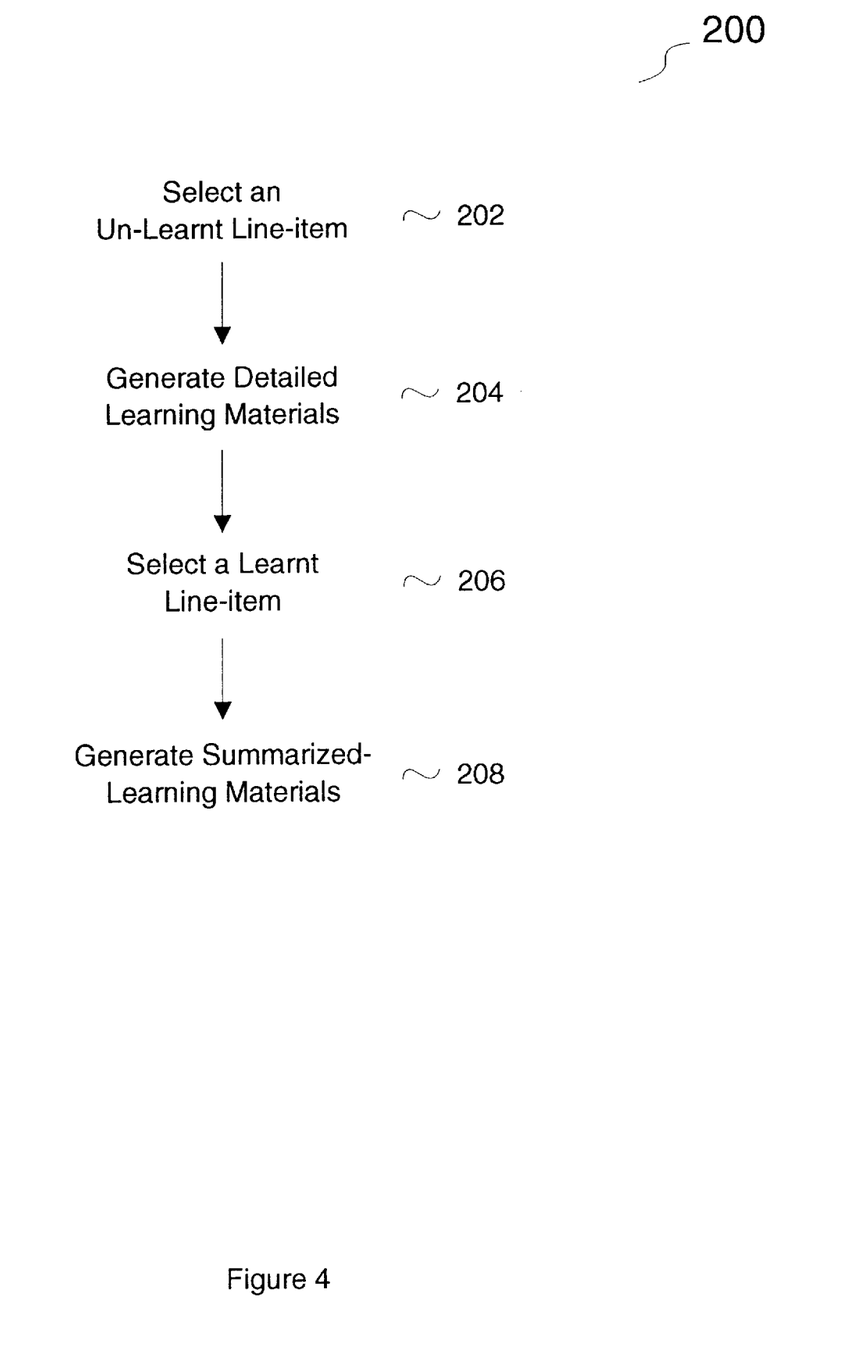
FIG. 4 shows a set of steps to implement one embodiment of the present invention.

FIG. 4 shows a set of steps 200 to implement one embodiment of the present invention. First, an un-learnt line-item is selected (step 202), and detailed learning materials on the un-learnt line-item is generated (step 204) for the student. Then a learnt line-item is selected (step 206), and summarized learning materials on the learnt line-item is generated (step 208). The following further describes each of the above steps.

Different methods may be used to select an un-learnt line-item (step 202). In one embodiment, the selector 102 first isolates the one or more un-learnt line-items that is at the lowest difficulty level among all the un-learnt line-items. Then out of the one or more isolated un-learnt line-items, one is randomly selected.

Figure 5:
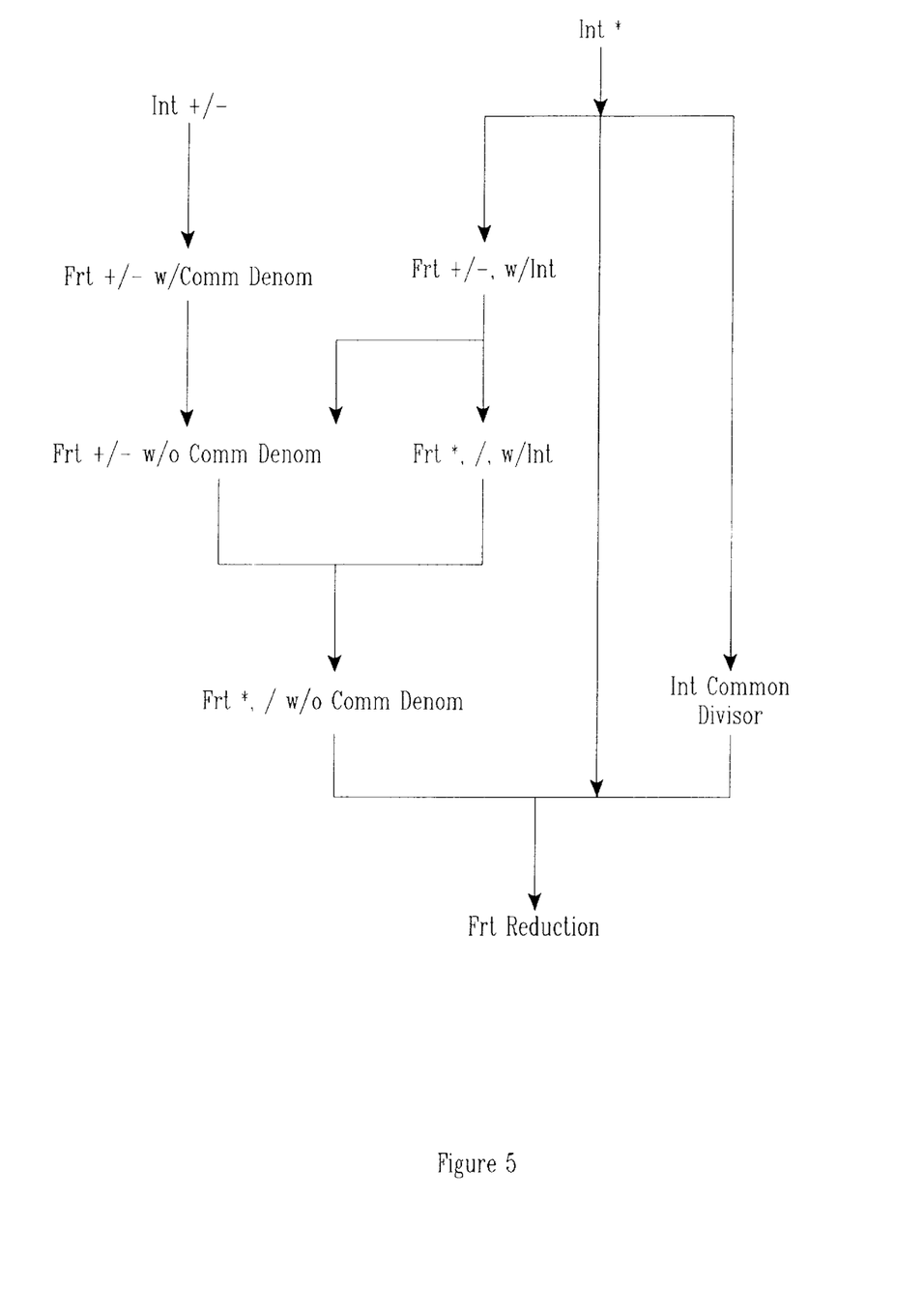
FIG. 5 shows an example of a difficulty hierarchy in the present invention.

In another embodiment, all the line-items of a subject form a difficulty hierarchy, with the subject itself at the top of the hierarchy, and the one or more easiest line-items at the lowest level of the hierarchy. Selecting an un-learnt line-item starts from the bottom of the hierarchy on up. If there are a number of un-learnt line-items at the same level of the hierarchy, one of them is randomly selected. FIG. 5 shows an example of such an hierarchy with some of the terms in the figure defined as follows:

| Int | Integer |
| +/− | Addition and subtraction |
| * | Multiplication |
| / | Division |
| w/ | With |
| w/o | Without |
| Frt | Fraction |
| Comm Denom | Common Denominator |

Figure 6:
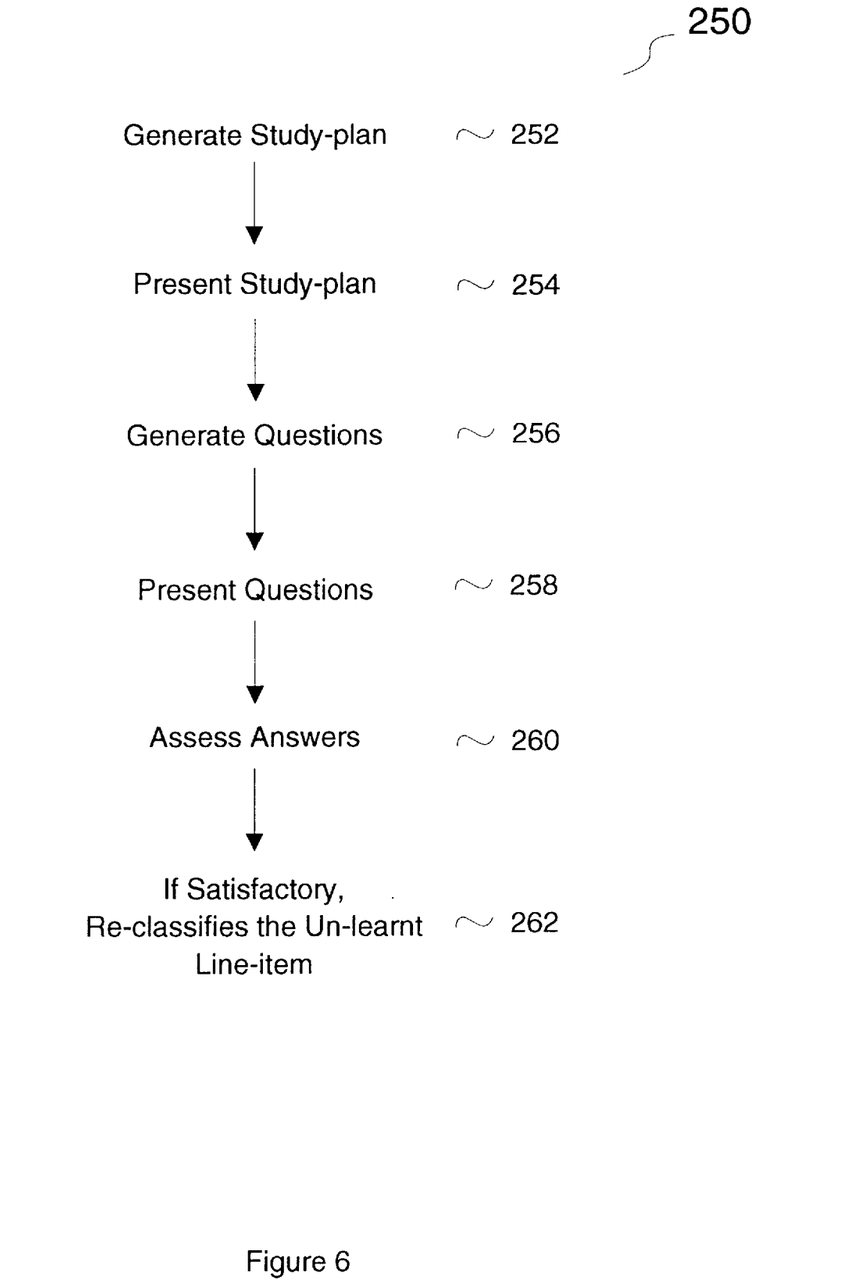
FIG. 6 shows a set of steps to generate a detailed learning material in the present invention.

After the un-learnt line-item has been selected, a learning material generator then generates detailed learning materials (step 204) for the student. FIG. 6 shows a set of steps 250 to generate detailed learning materials in the present invention. The selector 102 sends to the study-plan generator 108 the selected un-learnt line-item. The generator 108 accesses (step 252) from the study-plan storage medium 116 a set of detailed study-plan on the un-learnt line-item.

In one embodiment, the selector 102 sends the line-item entry E to the study-plan generator 108 to retrieve the corresponding study-plan from the study-plan storage-medium 116. Typically, there are a number of study-plan entries in the storage-medium 116, and they can be in the following format:

(line-item root, mode, study-plan)

The following serves as examples of a detailed study-plan for differentiating polynomial:

First, the system teaches the approach to generate derivatives based on the basic principle in differentiation, such as:

$$df(x)/dx = \lim_{h \to 0}((f(x+h)-f(x))/h)$$

Then the system teaches the generalized equation, such as:

$$((d\Sigma a_i x^i)/dx) = (93\ i * a_i x^{i-1})$$

Finally, the system teaches the importance of and the way to find optima and minima by solving the following equation:

$$((d\Sigma a_i x^i)/dx) = 0$$

Based on the line-item root and its mode in the line-item entry E, and with one set of detailed study-plan per un-learnt line-item, the generator 108 retrieves from the study-plan storage-medium 116, the corresponding detailed study-plan. Creating detailed study-plans for a subject should be obvious to experts in the subject, and will not be further discussed in this application.

The generator 108 then sends the retrieved study-plan with the line-item entry E to the presenter 114, which presents (step 254) the study-plan to the student. The study-plan can be a document containing studying materials for the un-learnt element. The document can be arranged as a list of screens, each of which covering part of the material. The presenter 114 typically includes the monitor 178, which presents the study plan to the student, who can go from one screen to another with the keyboard 176, or a mouse device. In another embodiment, the study plans are broadcast through a radio, or presented through a facsimile machine.

In this embodiment, as long as the study-plan has been presented to the student, it is assumed that the student has mastered the line-item. After the presentation, the study plan generator sends a mission-accomplished signal with the line-item entry E to the assessor 112. Presumably, the student, by going through the study plan, should have learnt the line-item.

Then, the assessor 112 verifies the mission-accomplished signal, and sends it with the line-item entry E to the selector. The selector, based on rules in the rules-storage medium 104, determines that the un-learnt line-item has been learnt. In the present situation, the rule is simply that once the study-plan has been presented, the line-item has been learnt. The selector 102 then re-classifies the mode in the entry E from un-learnt to learnt, stores the time when the line-item is re-classified in the time-stamp, and stores an identifier, such as "pass", in the mastery level. The line-item with its modified entry E is stored in the line-item storage-medium 106.

In another embodiment, after presenting to the student the detailed study-plan, questions are generated (step 256) and presented (step 258) to the students. Typical, students gain a better understanding on a subject through actively working on questions, than just through passively reading study plans.

In this embodiment, after the student indicates that he has finished studying the study-plan, the generator 110 accesses a set of questions from the question storage medium 118, and sends the questions to the presenter 114 to be presented (step 258) to the student. In one embodiment, each question is embedded in a question entry, which is of the following format:

(line-item root, mode, question-body, answer).

The term "question-body" describes the body of a question. The following serves as an example:

Subject: Mathematics.
    Major-topic: High School Algebra.
    Minor-topic: Fraction.
    Line-item: +/− with common denominator
    Mode: Un-learnt
    Answer      Question-body
    $28/37$     What is the sum of $2/37$, $3/37$, $8/37$ and $15/37$?
    $-2/43$     $17/43 - 25/43 + 6/43 = ?$ The selector 102 sends to the question generator 110 the line-item entry E. The question generator 110, by matching the line-item root and the mode in the line-item entry E with the line-item root and the mode in the question entries, selects one or more question entries. For each question-entry selected, it is sent to the assessor 112, with its question-body sent to the presenter 114 to be presented to the student. The student answers the questions, for example, by entering his answers through the keyboard 176 to the presenter 114, and the results are sent to the assessor 112. In another embodiment, the correct answers to the questions together with the student's answers are sent by the presenter 114 to the assessor 112.

In yet another embodiment, the learning materials only include questions. For example, the learning materials are for the un-learnt line-item of differentiating exponential functions. A number of questions are generated, including the question on expanding an exponential function based on Taylor expansion, the question on differentiating the Taylor-expanded exponential function, whose answer is the original Taylor-expanded exponential function, and the question on differentiating the exponential function, whose answer is the exponential function. The presenter 114 bypasses study plans, and receives the questions, which are presented to the students.

Note that the formats of the learning materials may change as the student is learning. The student can learn one line-item based on questions, and another based on study-plans. As an example, in the above example of a minor topic being differential calculus, for the different line-items, all of them can be learnt through both study-plans and questions, except for the line-item of differentiation, which is typically learnt through a study-plan. That study-plan covers the general differentiation concept, such as the following:

$$df(x)/dx = \lim_{h \to 0}((f(x+h)-f(x))/h)$$

For the embodiment where the learning materials include questions, the assessor 112 assesses (step 260) the student's answers by comparing the student's answers to the answers in the question entries previously received. Through the analysis, the assessor 112 determines the student's learning progress.

In one embodiment, the assessor 112 receives question entries from the question generator 110. The assessor 112 also receives the student's answers with their corresponding question-bodies from the presenter 114. For each question, using the question-body as a key, the assessor 112 evaluates the student's answer by matching it with the answer in the corresponding question-entry.

Note that generating the questions should be obvious to experts in the subject, and will not be further discussed in this application.

After the assessment, the assessor 112 sends the student's assessed results on the line-item back to the selector. If the study materials include questions, the student's assessed results can be in the form of a score, or a grade. If the study materials are study-plans only, the student's performance is an indicator depending on whether the plans have been presented to the student. The selector 102 based on rules stored in the rule storage-medium 104 determines if the assessed results are satisfactory or not (step 262). For example, a score of 70 or higher is satisfactory, and 69 or lower is unsatisfactory; a grade of C or better is satisfactory, and D or lower is unsatisfactory; or a study-plan, after presentation, is considered as satisfactory. If the assessed results are unsatisfactory, then the system proceeds as if the student has not learnt that line-item.

If the selector 102 is satisfied with the student's assessed results in the selected un-learnt element, as discussed above, the selected un-learnt line-item is re-classified as a learned line-item, by having its mode field changed to the learnt mode, with the time when this occurs stored in the time-stamp, and with the student's assessed results stored in the mastery level, such as 74. The modified entry E is re-stored in the line-item storage medium 106.

In one embodiment, the assessor 112 passes an assessment entry back to the selector 102. The format of an assessment entry is similar to that of a line-item entry, except the mastery level field is replaced by the student's assessed results in the corresponding line-item.

Figure 7:
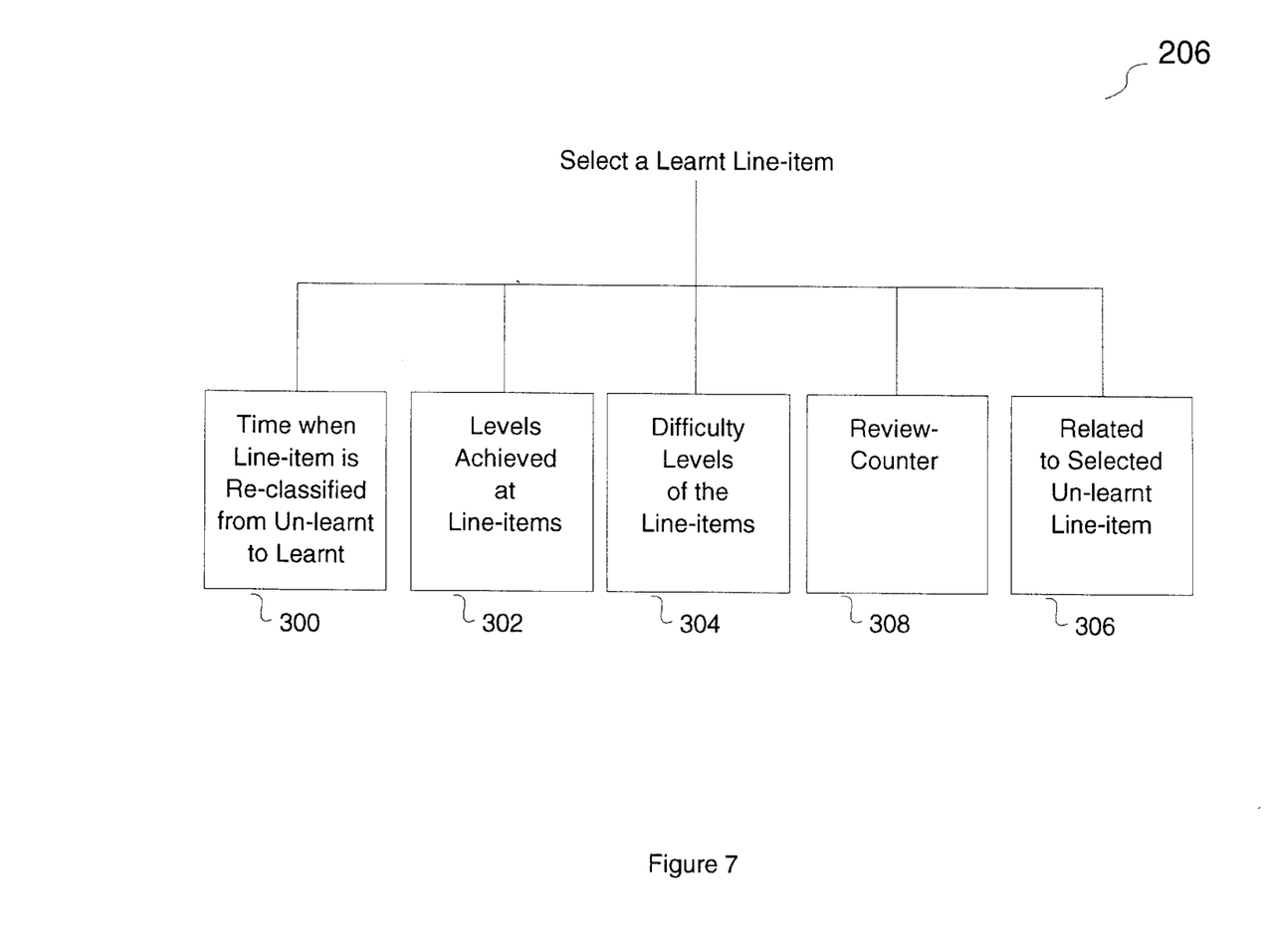
FIG. 7 shows a number of criteria to select a learnt line-item in the present invention.

After the generation of the detailed learning materials (step 204), the selector 102 selects a learnt line-item (step 206) based on one or more learnt-line-item-selection rules stored in the rules storage-medium. FIG. 7 shows examples of factors affecting such rules to select a learnt line-item in the present invention.

In one embodiment, the learnt line-item is selected depending on the time elapsed from the time when the line-item is re-classified from the un-learnt to the learnt mode (box 300). The selection process dis-favors the line-item that has just been re-classified because presumably the line-item is still fresh in the student's mind. As time passes, the student's memory begins to fade, and should be refreshed. Typically, a student starts to forget what he has learnt a number of weeks, such as three, after he has learnt it. Thus, in one embodiment, the selection process starts favoring reviewing the line-item that has been re-classified three weeks ago.

In another embodiment, the selection process dis-favors the line-item that has been re-classified long time ago because presumably the student has learnt other more difficult line-item during the interim period. This is similar to a student learning a subject in a semester. After the end of the semester, the student stops reviewing the subject, and starts studying a more difficult subject. Typically, a semester is about three months or twelve weeks. Thus, in one embodiment, the selection process begins to dis-favor reviewing the line-item that has been re-classified more than twelve weeks ago.

In one embodiment, the above elapsed time dependency in selection is embedded in a rule that is represented by the following equation:

$$\text{Weight } w(t) = k^* e^{-at} * (1-e^{-t})^b$$

where k, a, and b>0. Here the time t starts counting from the time when the line-item is re-classified. Initially, the weight function w(t) increases as time t increases, peaking with time being equal to ln ((a+b)/a). From that point onwards, the function decreases as time further increases. The values for a and b are chosen to determine the position of the peak, and the value for k is used to adjust the variance of the function.

The bigger the weight of a line-item, the better the chance for that line-item to be selected. As an example, the weight is chosen to peak when t is between three weeks (or 21 days) and twelve weeks (or 84 days), which averages to 53 days. Thus, w(t) peaks around 53 days, implying that:

$$\ln((a+b)/a) = 53.$$

The above exponential weight function is just an example representing the dependency on time. Other weight functions are also applicable, such as the Chi's Square functions.

In another embodiment, selecting a learnt line-item depends on the mastery level achieved by the student (box 302) when the line-item was changed from the learnt mode to the un-learnt mode. The lower the grade or the level achieved by the student, the higher the chance to select that line-item because the educational system should reinforce the student's weaker areas. Again, this can be represented by a weight function, which depends on the mastery level achieved by the student.

In yet another embodiment, selecting a learnt line-item depends on the characteristics of the line-item, such as the difficulty level of the line-item (box 304). The more difficult the line-item, the higher the probability to select that line-item because it is more likely for the student to be weak in that line-item, or that line-item is more significant than other line-items. Again, the dependency on difficulty level can be represented by a weight function, which tracks the difficulty level of the line-item.

For another different embodiment, selecting a learnt line-item depends on whether that line-item is related to the most recently selected un-learnt line-item (box 306). This embodiment favors a learnt line-item that is related to the un-learnt line-item because the student may form the relationship himself through working on both of them. For example, the un-learnt line-item just learnt is differentiating exponential functions. Then one learnt item to review may be the hyperbolic sine and cosine functions. The idea is for the student to form the relationship himself that differentiating hyperbolic sine is the hyperbolic cosine, and vice versa. Typically, a student enjoys learning a subject and remembers it better if he thinks that he, by himself, has developed some insights in the subject.

One way to identify related line-items is from the line-item entry shown in FIG. 1. Each line-item in an associated line-item root, such as 66, is related to the line-item in the parent line-item root 52. The degree of relatedness is represented by the association factor, such as 88. The line-item that is more closely related to the parent line-item has a larger association factor than a line-item that is not as closely related. Line-items not listed in the associated line-item root-list are either not related or too remotely related to the line-item in the parent line-item 56. In one embodiment, the weight w depends on the association factor.

In yet another embodiment, selecting a learnt line-item depends on whether that learnt line-item has been selected before, as shown in the review-counter (box 308). The value in the review-counter does not include one or more prior selections of the line-items when the line-item was in its un-learnt mode. The selection process discourages re-selecting a line-item that has been selected before. One way to achieve this result is to multiply the weight factor affecting which line-item to select by 1/(the value in the review-counter of that line-item+1).

The higher the factor, the lower the probability that the corresponding line-item is selected. Thus, the above equation reduces the probability of selecting a line-item that has been reviewed before.

One or more of the above factors may be combined in a learnt-line-item selection rule to influence the selection of a learnt line-item. The combination process can simply be based on a weight factor that depends on one or more of the above factors.

After selecting the learnt line-item, summarized learning materials are generated (step 208) to be presented to the student. Generally, summarized learning materials are more concise than the detailed learning material. In one embodiment, summarized learning materials do not include any questions to test the student. In terms of the process, in one embodiment, the selector 102 sends the line-item entry E to the study-plan generator 108 to retrieve the corresponding summarized study plan from the study-plan storage-medium 116. Typically, there are a number of study-plan entries in the storage-medium 116, and they can be in the following format:

(line-item root, mode, study-plan)

If the mode is a learnt mode, the study-plan is a summarized study-plan. The following serves as an example of a summarized study-plan for differentiating polynomial:

The system teaches the generalized equation:

$$((d\Sigma a_i x^i)/dx) = (\Sigma i \cdot a_i x^{i-1})$$

The system also teaches the following equation, which is used to find optima and minima:

$$((d\Sigma a_i x^i)/dx) = 0$$

Based on the line-item root and its mode in the line-item entry E, and with one summarized study plan per learnt line-item, the generator 108 retrieves from the study-plan storage-medium 116, the corresponding summarized study-plan. Creating summarized study-plans for a subject should be obvious to experts in the subject, and will not be further discussed in this application.

In another embodiment, summarized learning materials also include a number of questions to test the student. These questions may be different from those in one embodiment of the detailed learning materials. The answers are used to assess the understanding level of the student in that line-item.

In the above embodiments, the detailed learning materials are generated before the summarized learning materials. In another embodiment, detailed learning materials for an un-learnt line-item are generated (step 204) after the generation of the summarized learning materials (step 208). This allows the student to review a learnt line-item before studying detailed learning materials on an un-learnt line-item. This different approach is applicable if the learnt line-item is related to the un-learnt line-item. A review helps to prepare the student for the un-learnt line-item.

In one embodiment, after a line-item has been reviewed, its review factor 78 is incremented by one. For that embodiment, the selection of a line-item to be reviewed is inversely proportional to the review factor. Thus, the probability of again selecting a line-item which has previously been reviewed is reduced.

Figure 8:
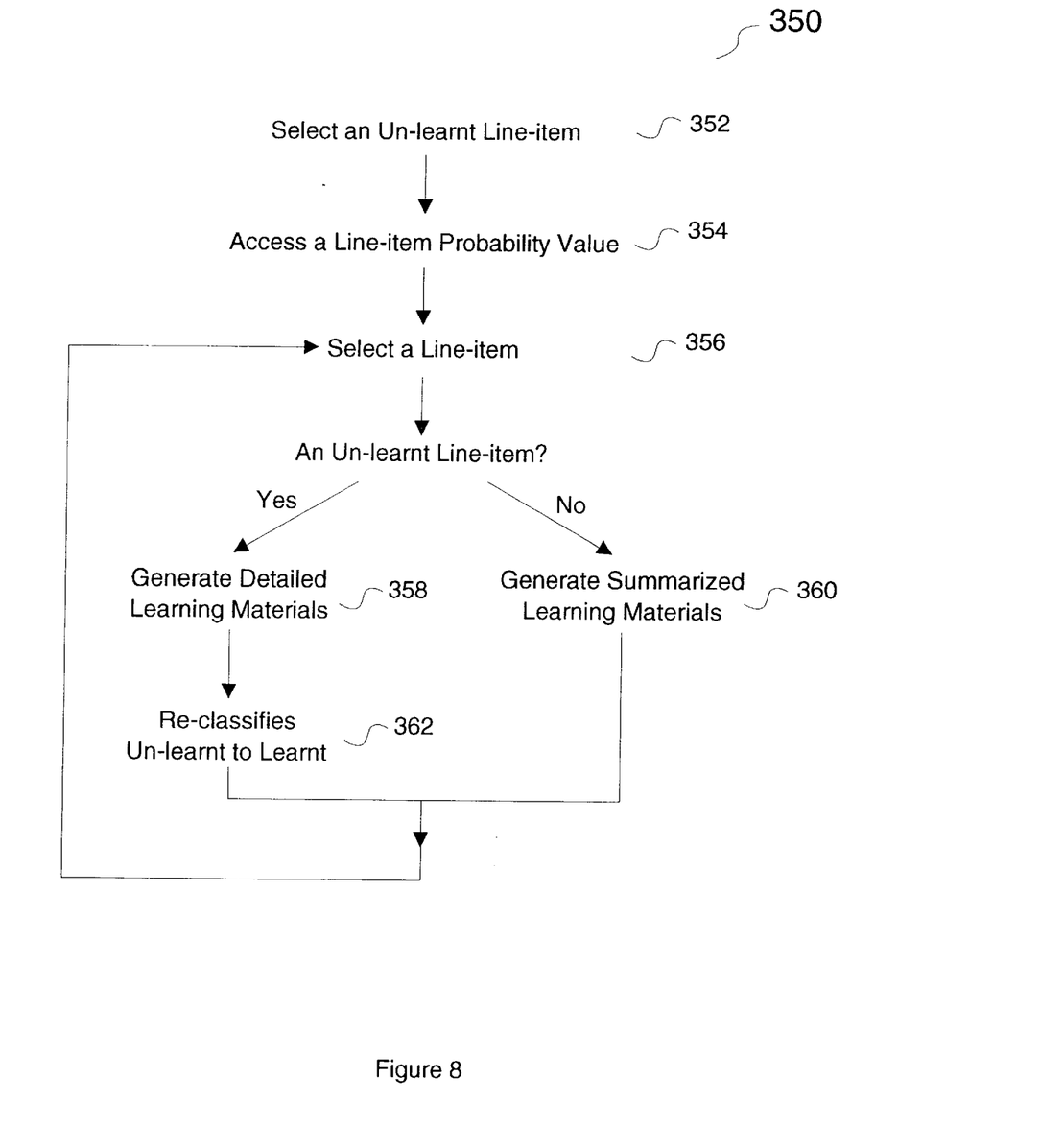
FIG. 8 shows a set of steps to implement another embodiment of the present invention.

The steps shown in FIG. 4 can be repeated. FIG. 8 shows a set of steps to implement another embodiment of the present invention, where there is repetition in selecting line-items. This embodiment starts from selecting an un-learnt line-item (step 352). Then, a line-item probability value is accessed (step 354) from the rules storage medium 104 to select a line-item (step 356). That value can be set by an instructor through a councilor 120. Note that there may be a number of steps in between the step of selecting (step 352) an un-learnt line-item and the step of accessing a line-item probability value (step 354). Anyway, typically, when a student is learning a subject, he starts with working on an un-learnt line-item. But it is not necessary to start the process with selecting an un-learnt line-item.

Figure 9:
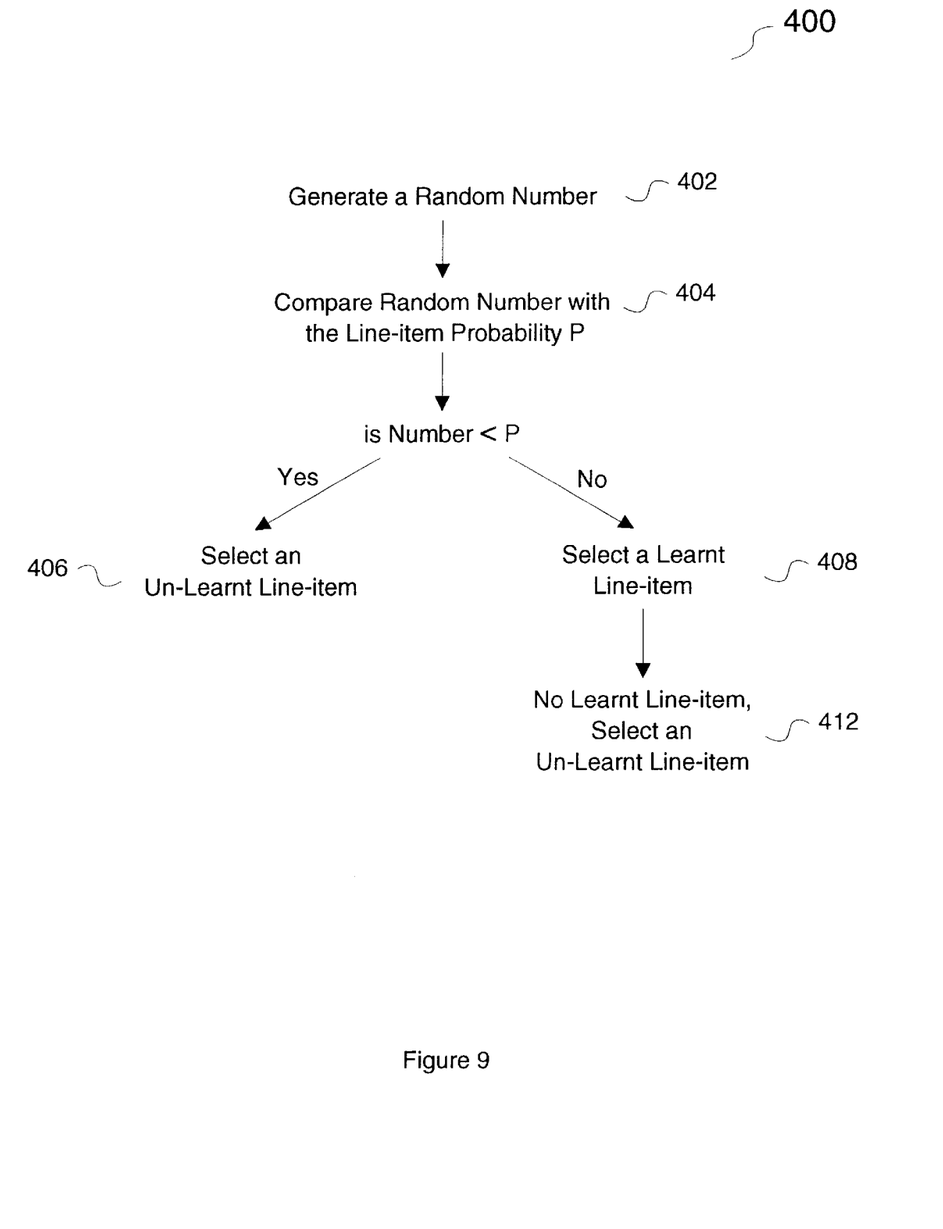
FIG. 9 shows a set of steps to select a line-item based on a line-item probability.

FIG. 9 shows one embodiment of a set 400 of steps to select an un-learnt line-item or a learnt line-item in the present invention based on the line-item probability P. From the value P, an un-learnt line-item is selected (100*P)% of the time and a learnt line-item (100*(1-P))% of the time. Then, for the selection process, the selector 102 generates (step 402) a random number between 0 and 1, and compares (step 404) the random number with P. If the number is smaller than P, the selector selects (step 406) an un-learnt line-item. If there is no more un-learnt line-item, the student has mastered the subject, and can proceed to another, or the system can select learnt-line-items for review. If the number is bigger than or equal to P, the selector selects (step 408) a learnt line-item. If there is no learnt line-item, the selector 102 selects (step 412) an un-learnt line-item.

In one embodiment, one characteristic of the probability P is that the higher the value of P, the more likely the selector 102 selects an un-learnt line-item. Such a system/method favors teaching new concepts. The smaller the value of P, the more likely the selector 102 selects a learnt line-item. Such a system/method favors reviews to reinforce the understanding of the learnt line-items before attempting new concepts.

In another embodiment, the selector 102 automatically selects the probability P, which changes as the student is working through the subject. The probability P depends on its previously selected item. To illustrate such an embodiment, suppose P(n) is the line-item probability after selecting n line-items, then $$P(n+1) = F(P(n))\ n > 0$$

where F is a function operating on P(n). The initial value P(0) is randomly set by the system to be between 0 and 1. The idea is that the invented system tends to switch to teach a learnt line-item after teaching one or more un-learnt line-items, and vice versa. To increase the probability of choosing a learnt line-item after selecting one or more un-learnt line-items, the function F produces a value smaller than its argument P(n). Similarly, to increase the probability of choosing an un-learnt line-item after selecting one or more learnt line-items, the function F produces a value larger than its argument P(n). The following serves as an example for this embodiment, with PI being the previously selected line-item:

$$P(n+1) = \text{Max}(0, P(n) - c) \text{ if PI is an un-learnt line-item.}$$

$$P(n+1) = \text{Min}(1, P(n) + d) \text{ if PI is a learnt line-item.}$$

"Min" denotes "The minimum of." "Max" means "The maximum of." Both c and d are constants between 0 and 1; they are chosen to reflect how quickly the invented system selects a different type of line-item. Each time a learnt line-item is selected, P is increased by an amount of d, until P reaches 1. Similarly, each time a un-learnt line-item is selected, PI is reduced by an amount of c, until P becomes 0.

After the line-item is selected, if it is an un-learnt line-item, detailed learning material is generated (step 358). If the student is satisfactory in learning the detailed learning material, the un-learnt line-item is re-classified (step 362) as a learnt line-item. On the other hand, if the selected line-item is a learnt line-item, then summarized learning material is generated (step 360). The process then repeats to select another line-item. The generation of learning materials and the re-classification process are as described above.

Conclusion

In the above examples, initially the modes of all line-items are classified as un-learnt. In one embodiment, even initially, the modes of some of the line-items are classified as learnt, which can be done by the instructor through the councilor 120. In another embodiment, initially all line-items are classified as learnt line-items. In such an embodiment, the student has previously learnt the subject, and the embodiment is just for reviews, which is suitable for one to prepare for an examination. Thus, only summarized learning materials are generated for the student, with no initial step of selecting an un-learnt line-item.

In the specification, learning materials can be study-plans, or questions, or study-plans with questions. In the embodiment where the learning materials only include study-plans, at least one line-item's learning materials include questions to more accurately assess the student's level in learning that line-item.

In a number of the above embodiments, rules are accessed from the rule storage medium. In another embodiment, those rules have previously been embedded in the programs implementing the present invention. With rules already embedded in the program, there is no need for accessing the rules.

Finally, a number of the above embodiments involve a number of steps that seem to have a specific sequence. For example, the step of generating detailed learning-material for an un-learnt line-item can comprise the steps of generating a detailed-study plan for the un-learnt line-item, presenting the detailed-study-plan to the student, generating questions on the un-learnt line-item for the student, and presenting the questions for the student. In the present invention, those embodiments include reshuffling the steps as long as there is no inherent dependency among those reshuffled steps. For example, one can reshuffle some of the steps of generating detailed learning-material for an un-learnt line-item to read: generating a detailed-study plan for the un-learnt line-item, generating questions on the un-learnt line-item for the student, presenting the detailed-study-plan to the student, and presenting the questions for the student.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A computer-aided educational method to reinforce a student's learning of a subject through reviews, the subject including a number of line-items, with at least one being a learnt line-item, and with the line-items being stored in a line-item storage-medium, the method comprising the steps of:

selecting a learnt line-item from the line-item storage-medium based on one or more learnt-line-item-selection rules; and generating summarized-learning materials on the learnt line-item for the student;

such that:

a learnt line-item is a line-item that the student has achieved a preset level in learning that line-item; and although the student has learnt a line-item, learning materials on the line-item might still be selectively generated for the student so as to reinforce the student's learning of the subject through reviews.

2. A computer-aided educational method as recited in claim 1 wherein:

the subject includes at least one un-learnt line-item, which is a line-item that the student has not achieved the preset level in learning that line-item; and the method further comprises the step of selecting an un-learnt line-item from the line-item storage-medium before the step of selecting a learnt line-item.

3. A computer-aided educational method as recited in claim 2 wherein the step of selecting a learnt line-item depends on the time elapsed from the time when the student has achieved the preset level for that line-item.

4. A computer-aided educational method as recited in claim 3 wherein each line-item has a weight;

the weight of each learnt line-item is a function of the time elapsed from the time the student achieved the preset level for that line-item; and the step of selecting a learnt line-item depends on the weight, which de-emphasizes the line-item the student has just learnt.

5. A computer-aided educational method as recited in claim 2 wherein:

each line-item has a difficulty level;

each line-item has a weight;

the weight of each learnt line-item is a function of the time elapsed from the time the student achieved the preset level for that line-item; and the step of selecting a line-item depends on the weight, which de-emphasizes line-items learnt more than a fixed period ago because presumably the student has progressed to have learnt even more difficult line-items.

6. A computer-aided educational method as recited in claim 2 wherein the step of selecting a learnt line-item depends on the level achieved by the student in learning that learnt line-item.

7. A computer-aided educational method as recited in claim 6 wherein each line-item has a weight;

the weight of each learnt line-item is a function of the level achieved by the student in learning that line-item; and the step of selecting a learnt line-item depends on its weight, which emphasizes on reinforcing a student's learning of a learnt line-item whose weight is lower than other learnt line-items.

8. A computer-aided educational method as recited in claim 2 wherein each line-item has a difficulty level; and the step of selecting a learnt line-item depends on the difficulty level of the line-items.

9. A computer-aided educational method as recited in claim 8 wherein:

each line-item has a weight;

the weight of each learnt line-item is a function of its difficulty level; and the step of selecting a learnt line-item depends on the weight, which emphasizes on selecting more difficult line-items.

10. A computer-aided educational method as recited in claim 2 wherein the step of selecting a learnt line-item depends on whether the learnt line-item is related to the selected un-learnt line-item so as to reinforce the student's learning of the subject through association.

11. A computer-aided educational method as recited in claim 2 wherein the step of selecting a learnt line-item depends on whether that learnt line-item has been selected before so as to discourage selecting a learnt line-item that has been selected before.

12. A computer-aided educational method as recited in claim 2 wherein the step of generating a summarized-learning material comprising the steps of:

generating a summarized study-plan for the line-item; and presenting the study-plan to the student.

13. A computer-aided educational method as recited in claim 2 further comprising the step of generating detailed learning-materials for the selected un-learnt line-item before the step of selecting a learnt line-item.

14. A computer-aided educational method as recited in claim 2 further comprising the step of generating detailed learning-materials for the selected un-learnt line-item after the step of generating summarized-learning materials on the learnt line-item.

15. A computer-aided educational method as recited in claim 14 wherein the step of selecting a learnt line-item depends on whether the learnt line-item is related to the selected un-learnt line-item so as to reinforce the student's learning of the subject through association.

16. A computer-aided educational method as recited in claim 14 wherein the step of generating detailed-learning materials comprising the steps of:

generating a detailed study-plan for the line-item; and presenting the detailed study-plan to the student.

17. A computer-aided educational method as recited in claim 16 wherein after the step of presenting the detailed-study-plan to the student, the method further comprises the steps of:

generating questions on the line-item for the student;

presenting the questions for the student; and assessing the student's answers to those questions to determine the level achieved by the student in learning that line-item.

18. A computer-aided educational method to reinforce a student's learning of a subject through reviews, the subject being divided into un-learnt and learnt line-items, with the learnt line-items being those the student has achieved a preset level in learning that line-item, the un-learnt line-items being those the student has not achieved the preset level in learning that line-item, and with the line-items being stored in a line-item storage-medium, the method comprising the steps of:

accessing a line-item probability value;

selecting either a learnt or an un-learnt line-item from the line-item storage-medium based on the line-item probability value;

if a learnt line-item is selected, then generating summarized-learning materials for the learnt line-item;

if an un-learnt line-item is selected, then generating detailed learning-material for the un-learnt line-item, and if the student has achieved a preset level in learning that line-item, then re-classifying the un-learnt line-item as a learnt line-item; and repeating from the step of selecting either a learnt or an un-learnt line-item;

such that although the student has learnt a line-item, learning materials on the line-item might still be selectively generated for the student so as to reinforce the student's learning of the subject through reviews.

19. A computer-aided educational method as recited in claim 18 wherein the learnt line-item is selected based on one or more learnt-line-item selection rules.

20. A computer-aided educational method as recited in claim 19 wherein:

each line-item has a difficulty level; and the step of selecting a learnt line-item depends on:

the level achieved by the student in learning that line-item, and the difficulty level of that line-item.

21. A computer-aided educational method as recited in claim 19 further comprising the step of selecting an un-learnt line-item from the line-item storage-medium before the step of accessing a line-item probability value.

22. A computer-aided educational method as recited in claim 21 wherein:

each line-item has a difficulty level; and the step of selecting a learnt line-item depends on:

the level achieved by the student in learning that line-item, the difficulty level of that line-item, the time elapsed from the time when the student has achieved the preset level for that line-item, and whether the learnt line-item is related to the un-learnt line-item just selected.

23. A computer-aided educational method as recited in claim 19 wherein:

the step of generating summarized learning-material for the learnt line-item comprises the steps of:

generating a summarized study-plan for the learnt line-item; and presenting the summarized study-plan to the student; and the step of generating detailed learning-material for the un-learnt line-item comprises the steps of:

generating a detailed-study plan for the un-learnt line-item;

presenting the detailed-study-plan to the student;

generating questions on the un-learnt line-item for the student;

presenting the questions for the student; and assessing the student's answers to those questions to determine the level achieved by the student in learning the un-learnt line-item.

24. A computer-aided educational apparatus to reinforce a student's learning of a subject through reviews, the subject including a number of line-items, with at least one being a learnt line-item, and with the line-items being stored in a line-item storage-medium, the apparatus comprising:

a storage-medium for storing the line-items;

a rule-storage medium for storing one or more learnt-line-item-selection rules;

a selector coupled to the storage-medium and the rule-storage medium for selecting a line-item based on at least one of the line-item selection-rules; and a learning-material generator for generating learning materials on the selected line-item for the student;

such that:

a learnt line-item is a line-item that the student has achieved a preset level in learning that line-item;

the selector based on one or more of the learnt-line-item-selection rules at least selects one learnt line-item for the generator to generate summarized learning-materials for the student; and although the student has learnt a line-item, learning material on the line-item might still be selectively generated for the student so as to reinforce the student's learning of the subject through reviews.

25. A computer-aided educational apparatus as recited in claim 24 wherein:

the subject includes at least one un-learnt line-item, which is a line-item that the student has not achieved the preset level in learning that line-item; and the selector at least selects one un-learnt line-item for the generator to generate detailed learning-materials for the student.

26. A computer-aided educational apparatus as recited in claim 25 wherein the learning-material generator further comprises:

a study-plan generator for generating study-plans;

a presenter for presenting to the student;

a question generator for generating questions; and an assessor for assessing the student's answers to questions.

* * * * *